UNITED STATES PATENT OFFICE.

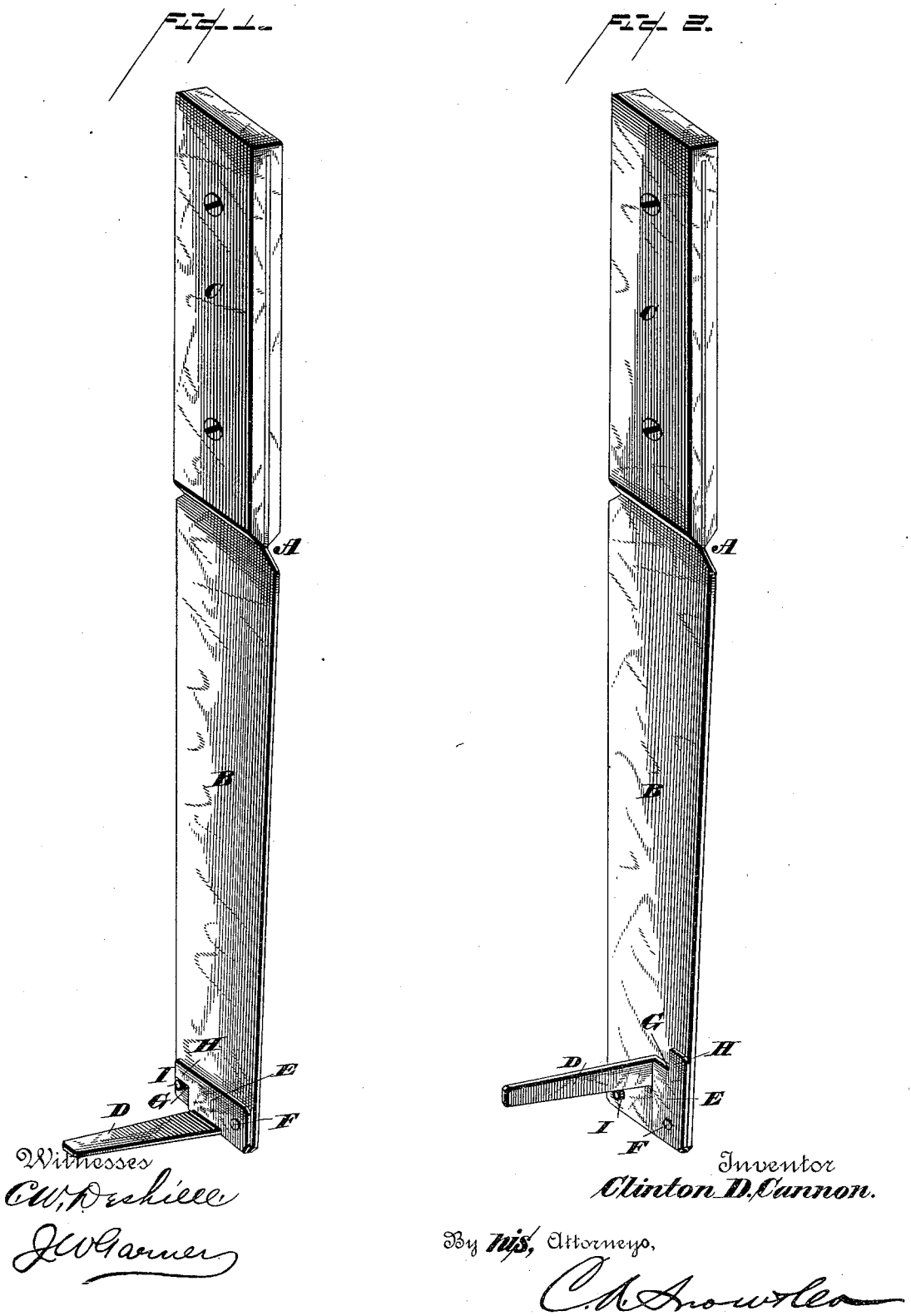

CLINTON D. CANNON, OF BATTLE CREEK, MICHIGAN.

BUTTER OR LARD CUTTER.

SPECIFICATION forming part of Letters Patent No. 366,567, dated July 12, 1887.

Application filed October 22, 1886. Serial No. 216,963. (No model.)

*To all whom it may concern:*

Be it known that I, CLINTON D. CANNON, a citizen of the United States, residing at Battle Creek, in the county of Calhoun and State of Michigan, have invented a new and useful Improvement in Butter or Lard Cutters, of which the following is a specification.

My invention relates to an improvement in butter or lard cutters; and it consists in the peculiar construction and combination of devices that will be more fully set forth hereinafter, and particularly pointed out in the claims.

In the drawings, Figure 1 is a perspective view of a butter or lard cutter embodying my improvements, showing the pivoted blade in a horizontal position and adapted for making a horizontal cut. Fig. 2 is a similar view, with the pivoted blade in a vertical position, and thereby adapted for making a vertical cut in the butter or lard.

A represents a butter or lard cutter comprising the broad straight blade B, having at its upper end the handle C. To the lower end of the blade B, on one side thereof, is a blade, D, which projects outwardly from the face of the blade B at right angles thereto, and has at its inner end a right-angled plate or base, E, which bears against the lower end of the blade B, and is pivoted thereto, near one corner, by a rivet, F.

From the foregoing it will be understood that the extended blade D may be either arranged with its cutting-edge in a horizontal position or in a vertical position by turning the same on the pivot F.

In the free end of the base-plate E is made a recess, G, and a shoulder, H, which projects across the upper side of the recess.

I represents a stud forming a stop, which projects from the lower corner of the blade B, opposite the pivot F, and serves as a detent against which the shoulder H of the base-plate E strikes when the latter is in a horizontal position.

The operation of my invention is as follows: In order to cut a piece of butter or lard from a firkin or cask, the blade B is first inserted vertically in the mass of butter or lard for a suitable depth, and is then moved edgewise to cut the sides of a piece or block of butter or lard of the desired shape and size, care being taken to keep the blade D projected toward the center of the block it is proposed to detach from the mass. While the blade B is thus being moved edgewise to cut the sides of the block the blade D is turned to a horizontal position by the resistance offered by the mass, thus causing the edge of the said blade to make a horizontal cut at the lower end of the vertical cut made by the blade B, the said horizontal cut separating the lower side of the block from the subjacent butter or lard. This blade D thus bears horizontally under the lower side of the block or piece of butter or lard, and by drawing upwardly upon the cutter the said blade catches under the block or piece which has been separated from the mass of butter or lard and raises it from the firkin or cask. When the blade B is being forced downwardly in the butter or lard, the resistance of the latter on the blade D causes the same to assume a vertical position and run edgewise in the butter or lard.

Having thus described my invention, I claim—

1. The butter or lard cutter having the straight cutting-blade B, in combination with the blade D, having the base E at its inner end pivoted to one side of the blade B, whereby the blade D projects substantially at right angles from the blade B and is adapted to be turned to either a vertical or horizontal position, substantially as described.

2. The combination, with a butter or lard cutter having the blade B, of the blade D, having the right-angled base-plate E at its inner end pivoted to one side of the blade B at the lower end thereof, whereby the blade D projects at right angles from the blade B and is adapted to swing through a quarter of a circle, for the purpose set forth, and the stop or detent I to retain the blade D in a horizontal position when the blade B is vertical, substantially as described.

In testimony that I claim the foregoing as my own I have hereto affixed my signature in presence of two witnesses.

CLINTON D. CANNON.

Witnesses:
MAURICE E. NEALE,
M. N. COBB.